US012508544B2

(12) United States Patent
Strange et al.

(10) Patent No.: US 12,508,544 B2
(45) Date of Patent: Dec. 30, 2025

(54) GEOTHERMAL CARBON CAPTURE SYSTEM

(71) Applicant: GOOD WATER ENERGY LTD, Claremont (AU)

(72) Inventors: Warren Strange, Claremont (AU); Michael Hain, Claremont (AU)

(73) Assignee: GOOD WATER ENERGY LTD., Claremont (AU)

( * ) Notice: Subject to any disclaimer, the term of this patent is extended or adjusted under 35 U.S.C. 154(b) by 43 days.

(21) Appl. No.: 18/710,119

(22) PCT Filed: Nov. 18, 2022

(86) PCT No.: PCT/AU2022/051379
§ 371 (c)(1),
(2) Date: May 14, 2024

(87) PCT Pub. No.: WO2023/087064
PCT Pub. Date: May 25, 2023

(65) Prior Publication Data
US 2025/0319435 A1    Oct. 16, 2025

(30) Foreign Application Priority Data
Nov. 19, 2021  (AU) ................................ 2021903732

(51) Int. Cl.
*B01D 53/62*      (2006.01)
*B01D 53/81*      (2006.01)
(Continued)

(52) U.S. Cl.
CPC ............. *B01D 53/62* (2013.01); *B01D 53/81* (2013.01); *E21B 41/0064* (2013.01);
(Continued)

(58) Field of Classification Search
CPC .. B01D 53/62; B01D 53/81; B01D 2257/504; B01D 2258/06; E21B 41/0064;
(Continued)

(56) References Cited

U.S. PATENT DOCUMENTS 8,096,934 B2    1/2012  Koide et al.
10,767,904 B2*  9/2020  Von Düring ............ F24T 10/20
(Continued)

FOREIGN PATENT DOCUMENTS

AU      2020101487 A4    9/2020

OTHER PUBLICATIONS

International Search Report for related International Application No. PCT/AU2022/051379; action dated May 25, 2023; (4 pages).
(Continued)

*Primary Examiner* — Hoang M Nguyen
(74) *Attorney, Agent, or Firm* — K&L Gates LLP

(57) ABSTRACT

The present disclosure relates to a geothermal carbon capture system, comprising; a primary liquid circuit circulating liquid into a geothermal well and returning heated liquid from a well head of the geothermal well, the primary liquid circuit passing through a condenser; a turbine driven by the heated liquid to power a compressor configured to draw in and compresses ambient air to feed a first compressed air supply and a second compressed air supply, wherein the first compressed air supply is directed to a separator to extract carbon dioxide therefrom; and the second compressed air supply drives a pump to force the carbon dioxide extracted from the separator towards a reinjection well for reinjection into geology surrounding the reinjection well.

20 Claims, 9 Drawing Sheets

(51) Int. Cl.
  *E21B 41/00*    (2006.01)
  *E21B 43/16*    (2006.01)
  *F24T 10/10*    (2018.01)
  *F24T 10/17*    (2018.01)
  *F24T 10/20*    (2018.01)
  *F24T 50/00*    (2018.01)

(52) U.S. Cl.
  CPC ............ *E21B 43/164* (2013.01); *F24T 10/10* (2018.05); *F24T 10/17* (2018.05); *F24T 10/20* (2018.05); *F24T 50/00* (2018.05); *B01D 2257/504* (2013.01); *B01D 2258/06* (2013.01)

(58) Field of Classification Search
  CPC ......... E21B 43/164; F24T 10/10; F24T 10/17; F24T 10/20; F24T 50/00
  See application file for complete search history.

(56) References Cited

U.S. PATENT DOCUMENTS

| | | | | |
|---|---|---|---|---|
| 12,098,710 | B1* | 9/2024 | Kitchen | E21B 43/36 |
| 2013/0341924 | A1* | 12/2013 | Lewis | C09K 8/594 |
| | | | | 166/305.1 |
| 2020/0173692 | A1 | 6/2020 | Buscheck et al. | |
| 2020/0347707 | A1* | 11/2020 | Bowdon | E21B 43/122 |
| 2021/0025265 | A1 | 1/2021 | Randolph | |
| 2021/0140684 | A1* | 5/2021 | Younes | F24T 10/20 |

OTHER PUBLICATIONS

Written Opinion for related International Application No. PCT/AU2022/051379; action dated May 25, 2023; (4 pages).

\* cited by examiner

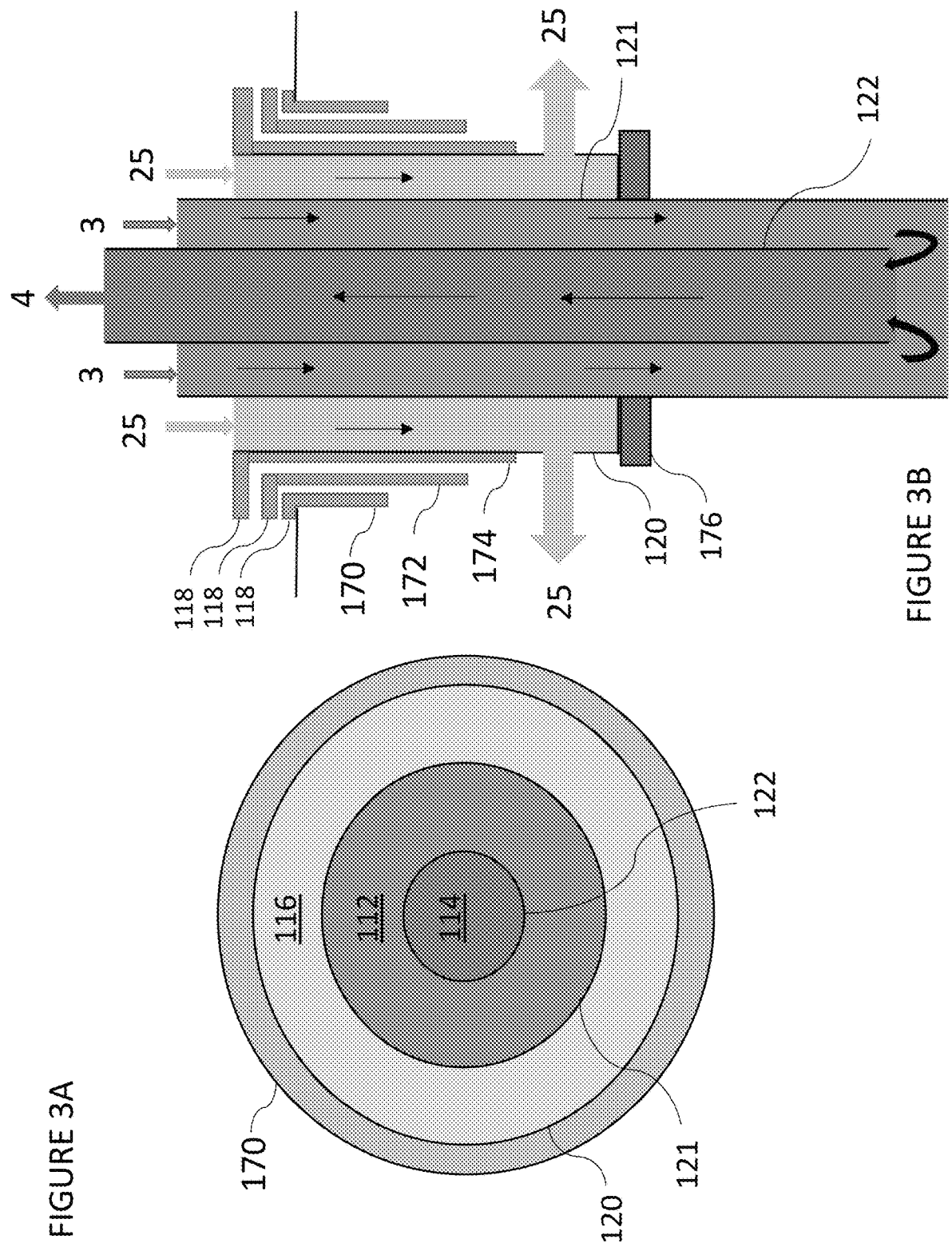

GEOTHERMAL CARBON CAPTURE SYSTEM

CROSS-REFERENCE TO RELATED APPLICATIONS

This application is the National Stage filing under 35 U.S.C. 371 of International Application No. PCT/AU2022/051379 filed on Nov. 18, 2022, which claims the benefit of earlier filing date and right of priority to Australian Application No. 2021903732 filed on Nov. 19, 2021, the contents of which are all hereby incorporated by reference herein in their entirety.

FIELD

The disclosure herein is directed to a geothermal carbon capture or sequestration system harvesting thermal energy from one or more geothermal wells to extract, capture and reinject carbon dioxide back into the surrounding well geology.

BACKGROUND

Global warming is having a disastrous effect on the planet and weather patterns around the globe. A main contributor, if not the main contributor, is the emission of greenhouse gases, particularly carbon dioxide, into the atmosphere. According to the World Meteorological Organization (WMO) the concentrations of Carbon dioxide in the atmosphere have increased by more than 148% since 1750. Carbon dioxide is produced by many industrial processes including the burning of fossil fuels.

As the planet gets warmer and drier, the release of carbon dioxide into the atmosphere accelerates: forests in drought release carbon dioxide into the atmosphere; light-reflecting snow cover from the poles continues to reduce; and the pH levels of our oceans drop as our oceans acidify from the uptake of increased carbon dioxide.

The options facing industry at this time are two-fold: (i) reduce the carbon dioxide volumes released into the atmosphere (ie. phasing out of fossil fuel use); and (ii) capture carbon dioxide and remove it from the atmosphere.

Any attempt to capture carbon dioxide through the use of machines or technology must be weighed against the power required to drive such machines. For example: removing Carbon dioxide from the atmosphere using electrically driven machines, that require the burning of fossil fuels to create power merely shifts the burden, while failing to address the problem as a whole.

While alternative energy sources like solar and wind energy have low emissions, it is geothermal sources that offer long-term, zero-emission power but drilling costs have historically made it expensive to do so.

Previous attempts at large scale geothermal energy projects in Australia were thwarted by high drilling costs and both technological and environmental problems using conventional oil and gas drilling techniques. However, the ability to harness deep thermal heat and to utilise this energy to provide zero-carbon or negative carbon alternatives to known processes, is highly desirable.

A deep well or array of wells can provide access to heated geology below the ground and can channel a fluid or alternative heat transfer medium therethrough to deliver thermal energy from the geology at the bottom of the well to the surface. The heated fluid can then be channelled to a plethora of mechanical systems to convert the thermal energy to mechanical work.

The productivity of the well or array of wells will depend on a number of factors, including a depth of the well, a thermal gradient of the surrounding geology, and a duration of the fluid travel time within the well. Commercially exploiting this energy source requires creating wells of sufficient depth to reach the required temperatures and controlling the flow of fluid around the system to efficiently harvest geothermal energy because the heat transfer coefficient of rock formations is generally low. Additional considerations in relation to thermal conductivities, heat capacities and geometries for each component of the well or well system will also influence the productivity thereof.

The disclosure described herein was conceived with these shortcomings in mind.

SUMMARY

In a first aspect, the disclosure provides a geothermal carbon capture system, comprising; a primary liquid circuit circulating liquid into a geothermal well and returning heated liquid from a well head of the geothermal well, the primary liquid circuit passing through a condenser; a turbine driven by the heated liquid to power a compressor configured to draw in and compress ambient air to feed a first compressed air supply and a second compressed air supply, wherein the first compressed air supply is directed to a separator to extract carbon dioxide therefrom; and the second compressed air supply drives a carbon dioxide pump to force the carbon dioxide extracted from the separator towards a reinjection well for reinjection into geology surrounding the reinjection well.

The geothermal well is preferably a closed loop well, wherein once the system is initiated by the injection of cool water into an intake of the geothermal well, a thermal syphoning effect provides all of the energy requirements at the surface for the capture, compression, injection and sequestration of carbon dioxide. No additional electricity is required to maintain the thermal syphoning effect and as such, the operating costs are essentially zero once the system is running. In some embodiments, the geothermal well may comprise a plurality of wells.

The system uses a single well or multiple geothermal wells to convert thermal energy into work, to draw atmospheric air into the separator (CO2 capture) and then uses geothermal wells to reinject the captured CO2 (sequestration) into the geology surrounding the wells, the atmospheric air serving as the cooling medium to reduce a temperature of the liquid in the primary circuit: essentially using the ambient air to provide an air cooler. The geothermal well may be a closed loop well. The primary liquid circuit is a closed system, such that the volume of liquid entering the geothermal well is equal to the volume of liquid exiting the geothermal well.

The geothermal well or wells are drilled sufficiently deep to generate the energy required to power the CO2 separation and compression unit without the need to draw electricity from additional sources; eg. the electrical power grid.

Once installed, this system will capture CO2 from the air and inject CO2 (CCS) into underground geological sandstone/limestone formations at or around the 2500 metre depth for potentially hundreds of years without other additional energy input requirements. Particularly, without the need for electrical energy inputs to maintain operation.

This system may further be adapted to collect fresh water from the ambient air drawn into the condenser. The collected water may be collected in tanks and delivered to fresh water markets where ever these systems are installed. The system may further be configured to harvest any one or more of oxygen, hydrogen and nitrogen from the ambient air.

The system may be installed at any location, and is not restricted to geothermal hot spots. The system may facilitate financial returns in the form of carbon credits and water sales.

In some embodiments, the geothermal well may comprise a liquid injection bore and a liquid extraction bore coaxially located with a carbon dioxide injection bore of the reinjection well. The liquid injection bore, the liquid extraction bore and the carbon dioxide injection bore may be connected via a triple well head. The liquid extraction bore may be centrally located in the geothermal well forming an inner annulus of the geothermal well delivering heated liquid to the turbine. The liquid injection bore may surround the liquid extraction bore forming an intermediary annulus of the geothermal well, delivering liquid into the geothermal well. The carbon dioxide injection bore of the reinjection well may encase each of the liquid extraction bore and liquid injection bore of the geothermal well, forming an outer annulus for delivering carbon dioxide into the surrounding geology of the reinjection well. The outer annulus may be bounded by a carbon dioxide inlet casing comprising at least one aperture for injecting carbon dioxide into the geology surrounding the reinjection well.

In some embodiments of the disclosure, the at least one aperture may be at a depth of between 2000 m-3000 m. In some embodiments, the at least one aperture may be located adjacent a sandstone layer of the geology. The at least one aperture may be one of a plurality of apertures. The plurality of apertures may be formed in a perforated casing of the carbon dioxide inlet casing. The plurality of apertures may be selectively closable or openable by rotating a closing sleeve relative to the carbon dioxide inlet casing to block the apertures therein. The perforated casing may extend circumferentially around a portion of the carbon dioxide inlet casing. The perforated casing may extend circumferentially around the entire carbon dioxide inlet casing.

In some embodiments of the disclosure, the outer annulus may be sealed at a depth below the at least one aperture. Sealing the outer annulus prevents the injection of carbon dioxide into undesirable geological layers eg. below the sandstone layer. The outer annulus may be sealed below the sandstone layer to prevent carbon dioxide from entering the geology below the sandstone layer. The outer annulus may be sealed at a depth of about 3000 metres. The outer annulus may be sealed by cement or concrete.

In some embodiments, the geothermal well may comprise a liquid injection bore and a liquid extraction bore, spaced apart from a carbon dioxide injection bore of the reinjection well. The liquid injection bore and the liquid extraction bore may be connected via a dual well head.

In some embodiments the turbine may be located downstream of the well head and upstream of the condenser. The primary liquid circuit may be a closed loop preventing exposure of the liquid to the geology of the well. The primary liquid circuit may provide an inlet for the introduction of top-up fluid into the primary circuit.

In some embodiments, the geothermal well may comprise at least one injection bore and at least one production bore spaced from one another in an array, each of the at least one injection bore and the at least one production bore being encircled by a dedicated carbon dioxide reinjection bore defining a plurality of reinjection wells. Each injection bore and each production bore of the geothermal well may comprise a dual-flow well head to either deliver liquid to or draw heated liquid from the geothermal well and simultaneously deliver carbon dioxide to the surrounding geology via the plurality of reinjection wells. Each bore of the geothermal well may form a single closed loop of the primary liquid circuit, such that the volume of liquid entering the geothermal well is equal to the volume of fluid exiting the geothermal well.

The condenser reduces a temperature of the primary liquid circuit by facilitating dissipation of thermal energy from the heated liquid to the ambient air drawn into the compressor before the liquid is directed back to the geothermal well. In some embodiments the condenser provides an air cooling system for the liquid of the primary liquid circuit sufficient to propagate a thermal syphoning effect in the primary circuit. The liquid exiting the geothermal well may be at a temperature of about 100 degrees Celsius (C) –300° C. The liquid entering the well may be at a temperature of about 5° C.-10° C. above a temperature of the ambient air drawn into the condenser. The separator may be configured to output at least one of nitrogen, oxygen, and water in addition to the carbon dioxide extracted from the compressed ambient air supply. In some embodiments the separator comprises a filtration system. In some embodiments the separator comprises a sorbent/solvent separation system. In further embodiments, the separator comprises a membrane separation system. In still further embodiments, the separator comprises a distillation separation system. Circulation of the liquid of the primary liquid circuit is sustained by a thermal syphoning effect propagated by the cooling of the condenser and the heating effect of the geothermal well.

In some embodiments, the primary circuit may comprise a start-up pump to initiate liquid flow in the primary circuit. The start-up pump may be driven from a third compressed air supply line from the compressor. The pump may be configured for connection with a pipeline for receiving a secondary carbon dioxide source and pumping the secondary carbon dioxide source towards the reinjection well for reinjection into the surrounding geology. The geothermal well may have a depth of between 3500 metres (m)-8000 m. More preferably, the geothermal well may have a depth between 4000 m-6000 m.

In some embodiments, the geothermal well may have a bottom-hole temperature between 100° C.-350° C. More preferably, the bottom-hole temperature may be between 130° C.-330° C.

In some embodiments, at least one of the geothermal well and the reinjection well may comprise a series of nested casings, extending downwardly from a surface into the geology surrounding the geothermal well. An outermost casing of the series of casing of the geothermal well and/or the reinjection well may extend from the surface to a depth of 1 m-50 m. A secondary casing of the series of casings may extend from a depth of about 1 m-600 mm, wherein the secondary casing is sized to sit within the outermost casing. A tertiary casing of the series of casings may extend from a depth of about 1 m-1200 m, wherein the tertiary casing is sized to sit within the secondary casing.

In some embodiments, the geothermal well comprises at least one injection bore and at least one production bore. In further embodiments, the geothermal well may comprise a plurality of bores. In some embodiments, the geothermal well may comprise one injection bore and four production bores, the injection bore centrally located of the four production bores. In some embodiments, the geothermal well may comprise one injection bore and two production bores, the injection bore centrally located of the two production bores. Each bore may be spaced between 50 m-150 m from any adjacent bore.

In some embodiments, each bore of the geothermal well may have a dedicated valving set comprising at least one of an inlet flow control valve and an outlet flow control valve.

In some embodiments of the system, the liquid of the primary liquid system may be water. In some embodiments of the system, the liquid may be distilled water. In some embodiments of the system, the liquid may be compressed air, carbon dioxide (CO2), various gases, petroleum, or oils produced from minerals or from bio processes, wherein the heated liquid in the primary circuit can be flashed to drive the turbine.

In some embodiments, the primary liquid circuit may be configured to drive the turbine indirectly. The primary liquid circuit may deliver heat energy to a secondary circuit to drive the turbine therefrom. The secondary circuit may receive heat from the primary circuit via a heat exchanger. The secondary circuit may be a closed loop system circulating a heat transfer medium selected from one of the following; compressed air, carbon dioxide, various gases, petroleum, or oils produced from minerals or from bio processes.

In some embodiments of the disclosure, the turbine may be substituted for a screw expander or similar mechanical device. The pump may also be substituted for a compressor in some embodiments.

In a further aspect, the disclosure provides a method of capturing carbon dioxide from ambient air and reinjecting the captured carbon dioxide into geological formations, the method comprising the steps of: (i) circulating a primary liquid in a primary liquid circuit into a geothermal well and returning heated liquid from a well head of the geothermal well, the primary liquid circuit passing through a condenser; (ii) driving a turbine from the heated liquid to power a compressor, the compressor configured to draw in ambient air and compress the ambient air into a plurality of compressed air supplies; (iii) supplying a first compressed air supply to a separator to extract carbon dioxide therefrom; and (iv) supplying a second compressed air supply to drive a pump configured to force the carbon dioxide extracted from the separator towards a reinjection well for reinjection into geology surrounding the reinjection well.

In some embodiments, the condenser uses the ambient air as a cooling medium to decrease the temperature of the heated liquid in the primary liquid circuit, thereby driving a thermal syphoning effect within the primary liquid circuit. As the ambient air passes through the condenser the temperature of the ambient air is increased before being delivered to the compressor.

In some embodiments, the method comprises the further step of directing excess thermal energy in the primary liquid circuit to the separator. Increasing an operating temperature of the separator may improve the efficiency of the carbon dioxide extraction process within the separator. The method may further comprise the step of cooling the liquid of the primary liquid circuit by drawing the liquid through the condenser.

In some embodiments, the method may further comprise the step of drawing the ambient air source through the condenser as a cooling medium. The geothermal well and the reinjection well may be coaxially located having a triple-flow well head. The geothermal well may comprise at least one injection bore and at least one production bore each bore of the geothermal-well spaced apart from one another. Each bore of the geothermal well may be coaxially located within a corresponding reinjection well, each reinjection well forming an outer annulus to the at least one injection bore and the at least one production bore of the geothermal well.

Various features, aspects, and advantages of the disclosure will become more apparent from the following description of embodiments of the disclosure, along with the accompanying drawings.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

BRIEF DESCRIPTION OF THE DRAWINGS

Exemplary embodiments of the disclosure are described below by way of example only, and not by way of limitation. Referring now to the accompanying drawings in which like numerals indicate like elements throughout the several figures:

FIG. 3A is a schematic view of the geothermal well of FIG. 1 in plan view, illustrating concentric annuluses of the well;

FIG. 3B is a schematic view of the geothermal well of FIG. 1 in a longitudinal cross section through the geothermal well;

Embodiments will now be described more fully hereinafter with reference to the accompanying drawings, in which various embodiments, although not the only possible embodiments, of the disclosure are shown. The disclosure may be embodied in many different forms and should not be construed as being limited to the embodiments described below.

DETAILED DESCRIPTION DISCLOSURE

The disclosure will now be described in relation to specific examples, having either a single geothermal well or a plurality of geothermal wells. It is contemplated that in some embodiments the geothermal well may be comprised of single multi-bore well have a multi-flow well head. However, in some embodiments, a plurality of wells are configured in an array, each well of the array being a dedicated injection well or a dedicated production well.

Figure 1:
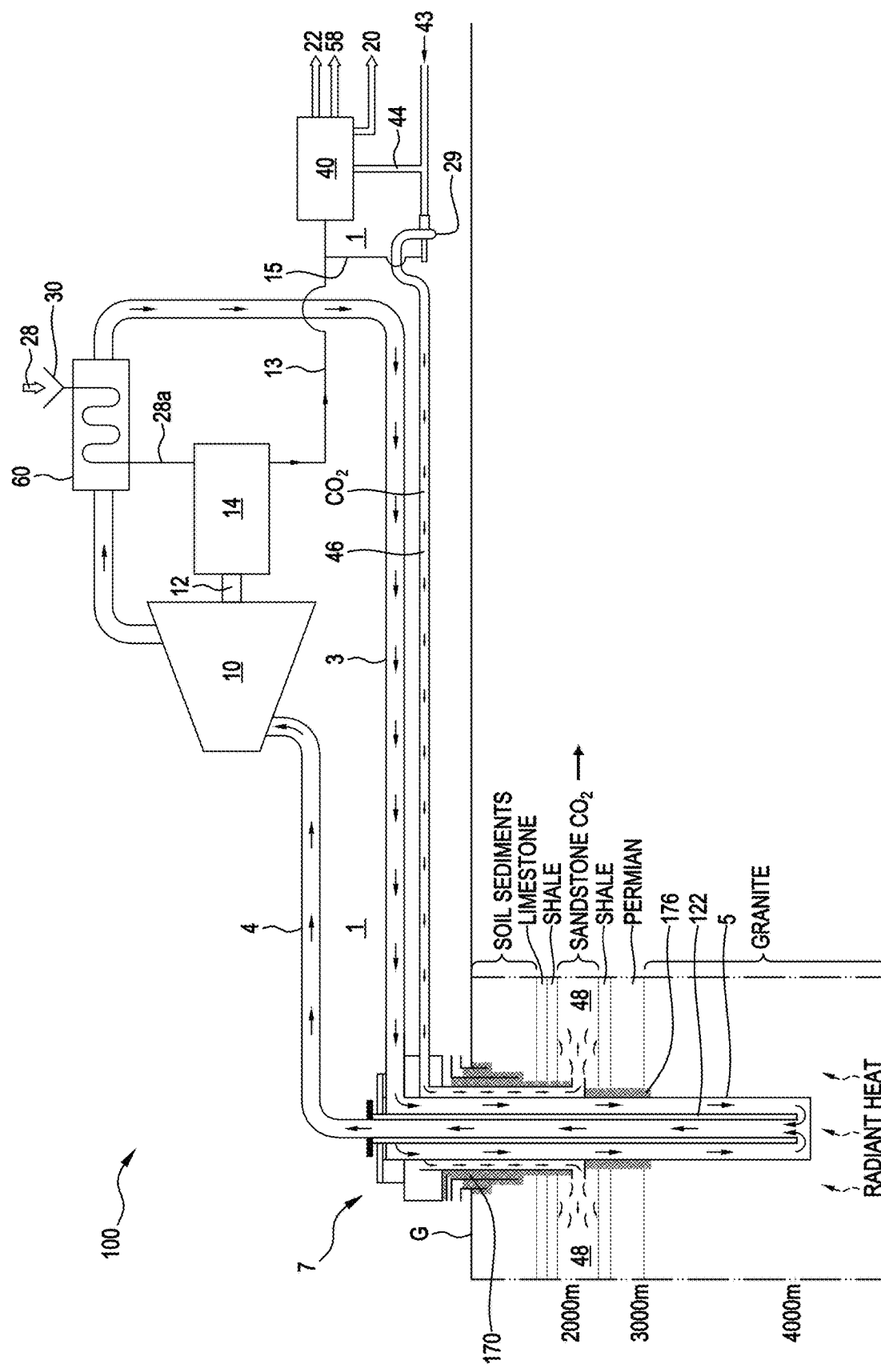
FIG. 1 is a schematic view of a geothermal carbon capture system according to a first aspect of the disclosure, comprising a single geothermal well.

Referring to FIG. 1, there is illustrated a geothermal carbon capture system (100), comprising; a primary liquid circuit (1) circulating liquid (3) into a geothermal well (5) and returning heated liquid (4) from a well head (7) of the geothermal well (5), the primary liquid circuit (1) passing through a condenser (60); a turbine (10) driven by the heated liquid (4) to produce a mechanical output (12) to power a compressor (14) configured to draw in and compress ambient air (28) to supply a first compressed air supply (13) and a second compressed air supply (15), wherein the first compressed air supply (13) is directed to a separator (40) to extract carbon dioxide (25) therefrom; and the second compressed air supply (15) drives a pump (29) to force the carbon dioxide (25) extracted from the separator (40) towards a reinjection well (5) for reinjection into geology surrounding the reinjection well (5).

The single well system (100) provides a triple-flow well head (7) allowing an inlet annulus (112) and an outlet annulus (114) of the well (5) to be coaxially located within a carbon dioxide inlet annulus (116) illustrated schematically in FIG. 3A. This configuration minimises drilling efforts locating each of the annuluses of the well nested one within another, such that the carbon dioxide inlet annulus (116) of the geothermal well (5) is located closest to the surrounding geology. While not illustrated in FIG. 1 the inlet annulus (112) and outlet annulus (114) can be swapped such that the inlet annulus (112) is central to the geothermal well (5). The arrangement illustrated in FIG. 1 provides the best thermal insulation for the heated liquid (4) being drawn from the well (5).

The system (100) uses thermal energy from the geothermal well (5) to drawn ambient air (28) into an intake (30), compress the air and capture carbon dioxide therefrom in the separator (40) and pump the captured carbon dioxide back into the geology (sequestration), with the ambient air (28) serving as a cooling medium for the condenser (40) reducing a temperature of the liquid (4) in the primary circuit (1): essentially using the ambient or atmospheric air (28) to provide an air cooler.

The condenser (40) requires a large surface area to reduce the temperature of the heated liquid (4) to within 5° C.-10° C. of a temperature of the ambient air (28). For example, if the ambient air (28) enters the condenser at about 25° C., the primary liquid can be cooled to about 30° C.-35° C. The temperature differential created by the condenser (40) is sufficient to maintain a thermal syphoning effect in the primary circuit (1).

The geothermal well (5) is drilled sufficiently deep to generate the energy required to power the carbon dioxide separator (40) and compression pump (29) without the need to draw electricity from additional sources; eg. the power grid.

In describing the pump (29) the terms pump and compressor are can be interchangeably. The pump (29) is powered by compressed air from the second compressed air supply line and compresses the carbon dioxide that is exhausted from the separator (40) at a pressure of about 37 Bar. The pump (29) also serves to pump or force the compressed carbon dioxide towards the carbon dioxide inlet annulus (116) of the reinjection well (5).

The carbon dioxide collected can be compressed into storage tanks (a receiver tank) to be released under pressure for reinjection into an outer annulus of a geothermal well. This well can be: (i) the same geothermal well (5) from which the thermal energy was harvested; (ii) an array of wells (11) having a selection of injection wells and production wells; (iii) closed or abandoned wells or well systems no longer in use. Once the carbon dioxide under pressure is injected into the well (5), it is forced into a suitable permeable geology, for example sandstone. This sandstone layer will typically be found around 2,000 metres but will vary depending on the location of the well. The carbon dioxide is not forced into geological layers at depths greater than 3,000 metres.

The production outlet (114) of the well (5) will have a temperature range between 100° C. and 300° C. The heated liquid (4) provides a sufficient temperature to efficiently run the turbine (10). Where the temperature of the heated liquid (4) drawn from the well (5) is below the desirable limits, the heated liquid (4) can be flashed to increase a temperature of a portion of the liquid (4) to drive the turbine (10). In some embodiments of the system (100) the primary liquid circuit (1) can be used to conduct heat via a heat exchanger to a secondary or binary circuit (also referred to as an ORC system). The thermal energy within the binary circuit can then be used to drive the turbine (10) in a closed loop.

As illustrated in FIG. 1, the primary circuit (1) is a closed loop and the liquid (3) entering the well (5) is not in contact with the geology of the well (5). This reduces the opportunities for the primary liquid to become contaminated or pick-up particulates from the well (5).

The turbine (10) provides a mechanical output (12) in the form of rotary work, which can be directly or indirectly used to power the air compressor (14). The compressor draws in ambient or atmospheric air (28) to the intake (30) at ambient temperatures and this air (28) is drawn through the condenser (60) to cool the heated liquid (4) of the primary circuit (1). As the liquid in the primary circuit (1) is cooled the thermal syphoning effect is generated in the primary liquid circuit (1) where the heated liquid (4) is forced upwards and out of the wellhead (7) while drawing in cooler liquid (3) to replace the heated liquid (4). The primary circuit (1) can be configured to comprise a start-up pump (not illustrated) to initiate movement in the primary circuit (1). Once the liquid is circulating the start-up pump is no longer required to maintain circulation of the primary liquid circuit (1). The start-up pump can be powered by electricity or by compressed air. The compressed air source for the start-up pump can be drawn from the compressor (14) as a tertiary compressed air supply.

In some embodiments, the turbine (10) of the system (100) can be replaced with a screw expander or similar mechanical device.

As the ambient air (28) is drawn through the condenser (40) heat (thermal energy) is exchanged between the heated liquid (4) of the primary circuit and the ambient air (28) increasing the air temperature and decreasing the temperature of the heated liquid (4).

After the ambient air (28) is heated (shown in FIG. 1 exiting the condenser (40) as (28a)), it is compressed by the compressor (14), a primary portion of the compressed air is supplied to the carbon dioxide separator (40). The separator (40) can be configured to separate carbon dioxide from the compressed air supply as a primary product. Additional to the carbon dioxide, the separator can be configured to extract any one of more of oxygen (58), nitrogen (22) and water (20) from the compressed air supply, providing an opportunity for additional commercially valuable products derived from the ambient air (28). A remaining portion of the heated compressed air (28a) from the compressor (14) is directed to the pump (29) to force the extract carbon dioxide towards the reinjection annulus (116) of the reinjection well (5).

The separator (40) can be configured to operate via a filtration system, filtering nitrogen, oxygen and water from the heated compressed air source. The separator (40) comprises a large filter, or series of filters, whereby the heated compressed air is forced through the filter/s to separate out molecules of carbon dioxide from the heated compressed air (28a), for example a membrane gas separation filter or a direct air capture filter. The extracted carbon dioxide can be permanently stored in deep geological formations (thereby achieving a minimised or negative emissions target).

A direct air capture (DAC) filter can also be used to extract carbon dioxide directly from the compressed atmosphere air (28a). These filters may use solid direct air capture technology where the filter chemically binds with the carbon dioxide. These filters can store the carbon dioxide therein which can be released with the application of heat. A portion of the captured carbon dioxide could thus be stored and transported to support other industries eg. food processing, for example. Additionally, the extracted carbon dioxide can be combined with hydrogen to produce synthetic fuels.

In some embodiments, the separator can comprise any one of a sorbent/solvent separation system; a membrane separation system; and a distillation separation system.

In some embodiments (not illustrated in FIG. 1) the liquid of the primary circuit (1) can be fed through the separator (40) before or after travelling through the condenser (60) to thereby use residual heat in the heated liquid (4) to heat the separator (40). Some forms of separator (40) can be configured to work more efficiently with the introduction of heat.

The carbon dioxide extracted from the ambient air (28) is exhausted from the separator (40) at outlet (44) which is then channelled to the pump (29) to be compressed and directed to the carbon dioxide inlet annulus (116) of the well (5). A secondary carbon dioxide feed (43) can be provided to the pump (29) for introducing carbon dioxide from third parties or alternative sources into the system (100). This provides a further commercial service offering in that third parties can elect to use this responsible sequestration system for carbon dioxide emissions produced from other processes. For example, the system (100) can be used to scrub carbon dioxide from a neighbouring power plant, and as such the decision on where to locate the system (100) may be at least partly based on a location of the power plant where the carbon dioxide emissions from the power plant are blended via feed (43) for reinjection into well (5). The system (100) does not need to be close to the power plant and could in fact be located several kilometres away from plant, preferably downwind, to draw greater amounts of carbon dioxide into the air intake (30).

The flow temperature of primary liquid into the inlet annulus (112) of the well (5) will be about 5° C.-10° C. above the temperature of the ambient air (28) drawn from the atmosphere. The inlet annulus (112) and outlet annulus (114) of the well (5) continue to a depth of about 4000 m-6000 m to provide a liquid flow path sufficient to heat the liquid to the required temperatures. In contrast, the carbon dioxide reinjection annulus (116) is much shallower, extending into the surrounding geology to a depth of about 2000 metres and no more than 3000 metres. At 2000 m-3000 m the carbon dioxide reinjection annulus (116) is surrounded by limestone and sediments and/or sandstone layers in the geology suitable for absorbing carbon dioxide therein. The carbon dioxide reinjection annulus (116) does not extend below this 3000 metre depth and is sealed to the surrounding geology at this depth by concrete or cement (176) to prevent the reinjected carbon dioxide being forced into granite or other non-suitable geological formations.

Figure 2:
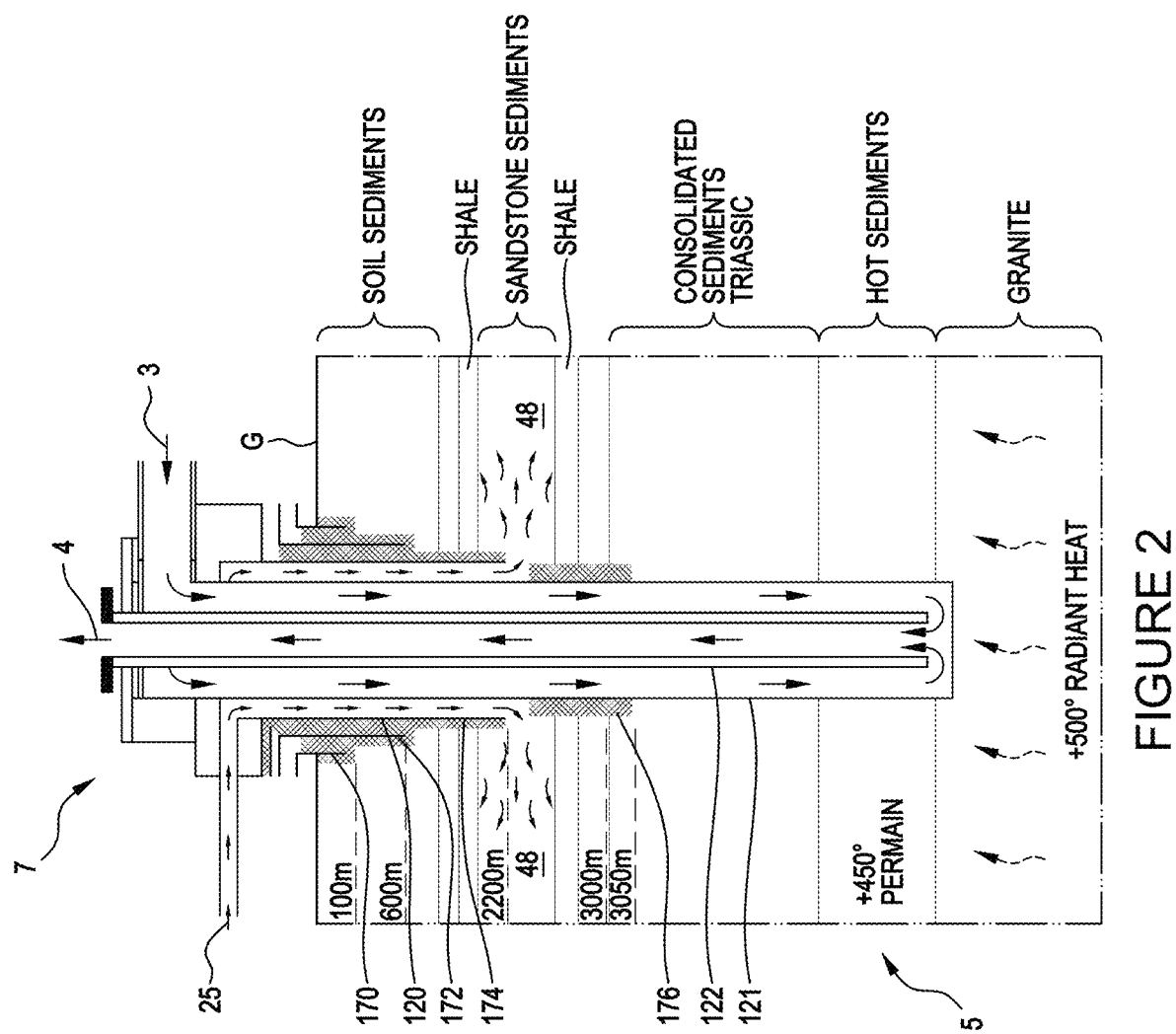
FIG. 2 is a cross-sectional view of the geothermal well of FIG. 1, illustrating the channels therein.

The well (5) comprises a number of nested supports in the form of casings, a first surface collar casing (170) extending from the ground level or surface (G) to a depth of about 50 metres (shown in FIGS. 7A and 7B). A second surface casing (172) is positioned within, and may abut, the first collar casing (170), the second surface casing (172) extending from the surface (G) to a depth of about 600 metres, this second surface casing (172) interposed between the first collar casing (170) and a third inner casing (174), as illustrated in FIGS. 1 and 2. The third inner casing is positioned within, and may abut, the second surface casing (172), the third inner casing (174) extending from the surface to a depth of about 1200 metres. The remaining bore of the well (5) between 1200 m and the bottom-hole depth is insulated by the surrounding geology.

Each casing (170,172,174) reduces in diameter, in one embodiment the first collar casing (170) has a diameter of about 30 inches, the second surface casing (172) has a diameter of about 24 inches, and the third inner casing (174) has a diameter of about 18 inches.

The first collar casing (170) and second surface casing (172) extend through soils and sedimentary layers of the geology. The third inner casing (174) extends past layers of shale and into a sandstone layer, while the remaining bore of the well (5) below 1200 m passes through Triassic and Permian layers of the geology to expose the liquid of the primary circuit (1) to hot sediments (illustrated in FIG. 2): the Permian layer radiating heat to the well (5) at temperatures of 450° C. and above.

The inlet annulus (112), outlet annulus (114) and carbon dioxide injection annulus (116) of the well (5) are sealed from each other by a series of casings. The outlet annulus (114) is bounded by an insulated casing (122) configured to have a circular cross-section. The inlet annulus (112) is bounded by the insulated casing (122) and a well inlet casing (121). The carbon dioxide injection annulus (116) is bounded by the well inlet casing (121) and a carbon dioxide inlet casing (120), illustrated schematically in FIG. 3A disposed concentrically one within the other.

The carbon dioxide inlet casing (120) provides one or more apertures (48) immediately proximate a sandstone layer of the geology (or limestone) at a depth of about 2000 m-3000 m, and more preferably between 2200 m and 2600 m, although these depths will vary given the location and surrounding geological formations of the area. The apertures can be formed in a perforated section (49) of the carbon dioxide inlet casing (120), illustrated in FIG. 4B. The apertures (48) can extend around an entire circumference of the carbon dioxide inlet casing, or can be confined to portions thereof to provide additional control to the reinjection of carbon dioxide into the geology. The carbon dioxide inlet casing (120) is sealed with concrete/cement (176) at around the 3000 m depth to confine the carbon dioxide reinjection depth to above 3000 m.

Once installed, the system (100) will capture carbon dioxide from ambient air (28) and inject carbon dioxide (CCS) for potentially hundreds of years without additional energy import requirements, ie. no additional electrical input is required to run the system (100). The primary maintenance requirement will be to the carbon dioxide separator (40) which will be a requirement for cleaning and replacing of filters for the system to continue to run efficiently.

The additional system outputs, like water/nitrogen/oxygen can be collected from the separator (40), where for example, the water can be collected in tanks and delivered to fresh water markets where ever the systems (100) is installed.

The system (100) can be installed at any location, and is not restricted to geothermal hot spots. It is also contemplated that the system (100) can be installed at a distance of several kilometres from the geothermal well (5) or wells supplying thermal energy to the system.

In some embodiments of the system (100) the geothermal well (5) for extracting thermal energy can be a discrete, separate well to the carbon dioxide reinjection well, allowing the captured carbon dioxide to be reinjected into an abandoned well, for example an off shore oil drilling well no longer producing.

Geothermal Well

Figure 3C:
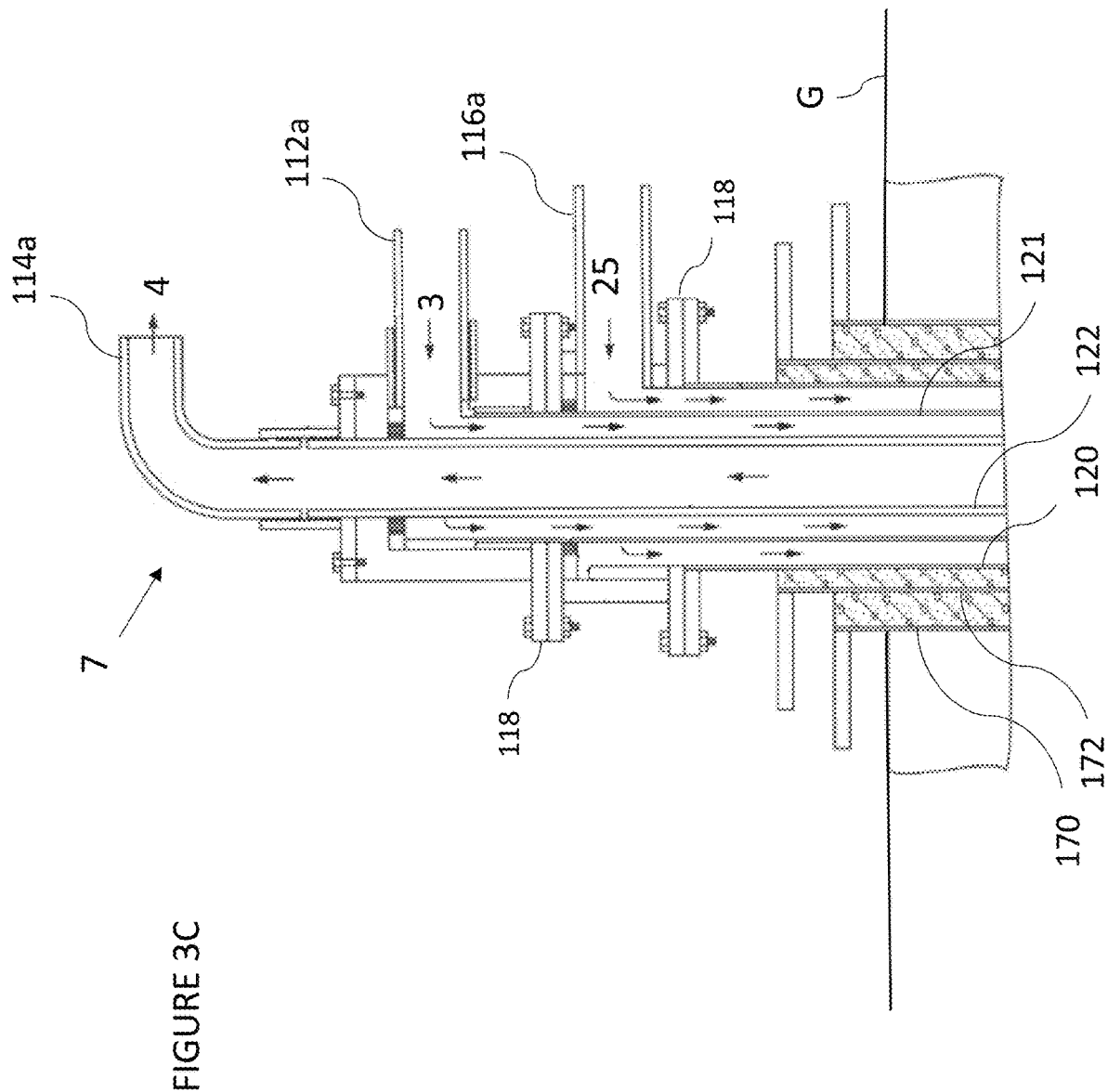
FIG. 3C is a cross-sectional view of a well head of the well of FIG. 1, illustrating a triple-flow head configuration.

Further details of the geothermal well (5) are described in relation to FIGS. 3A-3C herein. FIGS. 3A and 3B schematically illustrate a plan view through a cross-section of the well (5) and a longitudinal section through the well (5), respectively.

The cross-section of the well (5) in FIG. 3A, illustrates a nested arrangement wherein the inlet annulus (112), outlet annulus (114) and CO2 injection annulus (116) are coaxially located within the collar casing (170). The collar casing (170) has a diameter between 30 inches and 32 inches. The carbon dioxide injection annulus (116) is the outermost annulus and thus in closest proximity to the geology surrounding the well (5). The outlet annulus (114) is illustrated in FIG. 3A as the innermost annulus (but need not be) where the greatest insulation is provided to the heated liquid (4) being drawn from the well (5).

FIG. 3B illustrates the plurality of casings (170,172,174) supporting the well (5) at the surface (G), in contact with the carbon dioxide inlet casing (120) for channelling carbon dioxide into the geology. The well inlet casing (121) seals the primary circuit (1) from the carbon dioxide injection annulus (116), and the carbon dioxide injection annulus (116) is cement (176) sealed. The well inlet casing (121) draws the primary liquid down in to the well (5) travelling vertically while heating in contact with the hot geology before being drawn into the insulated casing (122) and drawn up through the centre of the well (5).

The carbon dioxide inlet casing (120) has a diameter of about 22 inches. The well inlet casing (121) has a diameter of about 12¼ inches. The carbon dioxide injection annulus (116) has a diameter of between 13 inches and 18 inches. The insulated casing (122) has a diameter of about 12 inches.

FIG. 3C is a cross-sectional view of the well head (7) illustrating a series of coupling flanges (118) for clamping an inlet (112a) of the inlet annulus (112) to an outlet (114a) of the outlet annulus (114) and an inlet (116a) of the carbon dioxide injection annulus (116) together. The assembled well head (7) receives the liquid (4) from the primary liquid circuit (1) and using the thermal syphoning effect, draws the liquid within the well (5) as the circuit begins flowing. In some embodiments, 25° C. liquid (eg. water cooled after generating the mechanical output 12) is drawn down the well (5) via inlet (112a) where the liquid (3) is heated up on its journey to the bottom of the well (5) and then pushed to the surface at the well head (7) via the annulus outlet (114a).

Heat from the bottom-hole geology is transferred to the primary liquid and the increased temperature and pressure forces the heated liquid (4) up the insulated casing (122) to the surface (G).

Multi-Well Carbon Capture System

Figure 4A:
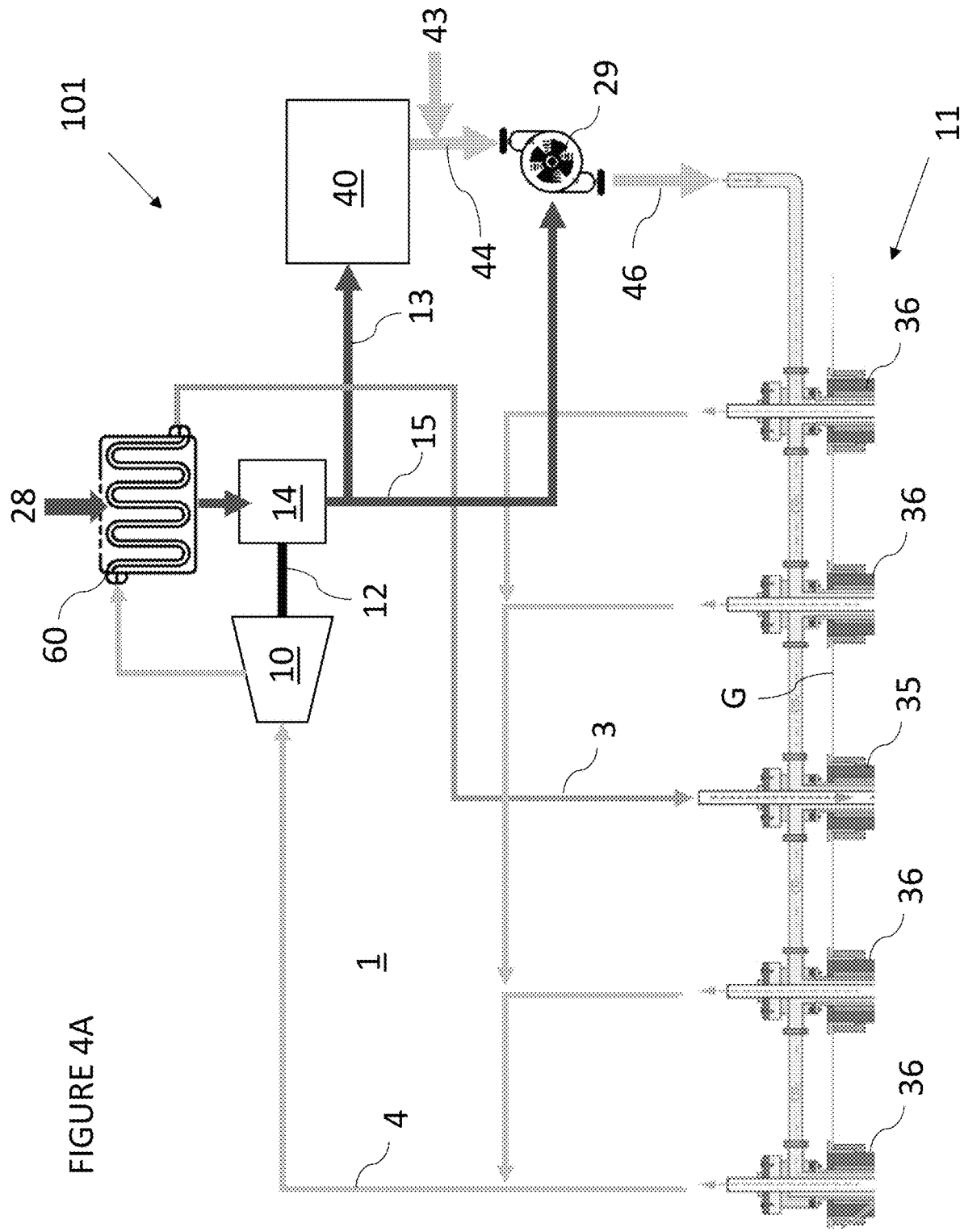
FIG. 4A is a schematic view of a geothermal carbon capture system according to a second aspect of the disclosure using multiple geothermal wells in an array.

Referring to FIG. 4A, there is illustrated a geothermal carbon capture system (101) having a multi-well subterranean array (11). The above surface (G) elements of the system (101) are the same as those described in relation to system (100) herein. FIG. 4A illustrates a possible routing for the primary liquid circuit (1) delivering liquid to and from the well array (11), where the array (11) comprises a single injection well (35) and four production wells (36). In the system (101) each wells of the array (11) comprises a dual-flow well heads to allow multiple points for carbon dioxide injection into the surrounding geology of each well.

The array (11) can be configured to have a plurality of production wells (36) and injection wells (35) depending on the thermal requirements of the system (101). Each production well (36) and injection well (35) can be configured with an inlet or outlet flow valve, allowing any one or more wells of the array (11) to be closed from the system (101) for maintenance without having to shut down the entire array (11).

The array (11) illustrated in FIG. 4A locates the injection well (35) centrally to the array to evenly disperse the liquid (4) as it travels around the circuit (1); however, this is merely a preferred option and not a limitation to the array (11). The array (11) is described in more detail in relation to FIG. 4B.

Each production well (36) comprises a bore (36a) and a well head (36b), and the injection well (35) comprises a bore (35a) and a well head (35b). Each well of the array (11) is interconnected by a horizontal bore (8) to allow the liquid of the primary circuit (1) to circulate therein. The array (11) is a closed system and the volume of liquid injected into well (35) is equal to the volume of liquid drawn collectively from the production wells (36). For example, liquid is drawn into injection well (35) at the well head (35b) at a rate of 120 Litres/second.

The liquid heats as it travels horizontally down the bore (35a) until it reaches a junction (9) at the bottom of the bore (35a). The liquid is split at the junction (9) into two equal flows towards the production wells (36) disposed on either side of the injection well (35) in the array (11). The liquid (4) continues to heat as it traverses the horizontal bore (8) although the majority of thermal energy uptake to the liquid (4) occurs in the bores (36a) of the production wells (36). The dual flows of heated liquid (4) is again equally split at junctions (9A) to further direct the heated liquid (4) to the outermost production wells (36) of the array (11). The heated liquid (4) is drawn through a bend or elbow (6) transitioning between the horizontal bore (8) and the outer vertical bores (36a) and exhausted from each of the four production wells (36) at a rate of 30 Litres/second wherein the combined output from each of the production wells (36) is directed to the turbine (10) to generate the mechanical output (12).

Each well head (35b, 36b) of the array (11) comprises a dual-flow well head, having an outer carbon dioxide injection annulus (116) and either of a well inlet annulus (112) or a well outlet annulus (114). The well inlet annulus (112) is typically a greater diameter to the well outlet annulus (114), having a diameter of about 17 inches. The well outlet annulus (114) has a diameter of about 12 inches. The horizontal bore (8) has a diameter of about 11 inches.

As the primary liquid circuit (1) delivers thermal energy to the turbine (10) to drive the compressor (14) the carbon dioxide extracted from the ambient air (28) is driven by the pump (29) into the carbon dioxide pipeline (46) delivering heated, compressed carbon dioxide to the carbon dioxide injection annulus (116) of each well in the array (11). As the carbon dioxide injection annulus (116) is the outermost annulus of each well or the array (11) the heated pressurised carbon dioxide provides an additional insulating layer to the liquid of the primary liquid circuit (1).

In one embodiment of system (101), the carbon dioxide pipeline (46) can be directed away from the geothermal well array (11) to an abandoned or unused well array, which can be adapted to receive carbon dioxide for reinjection, thereby separating the geothermal wells providing thermal energy from the reinjection well/s where the carbon dioxide is reinjected. This may be an alternative arrangement to that shown in FIG. 4A, or an addition to the pipeline (46) to allow for additional reinjection wells to be added to the system (101).

Figure 4B:
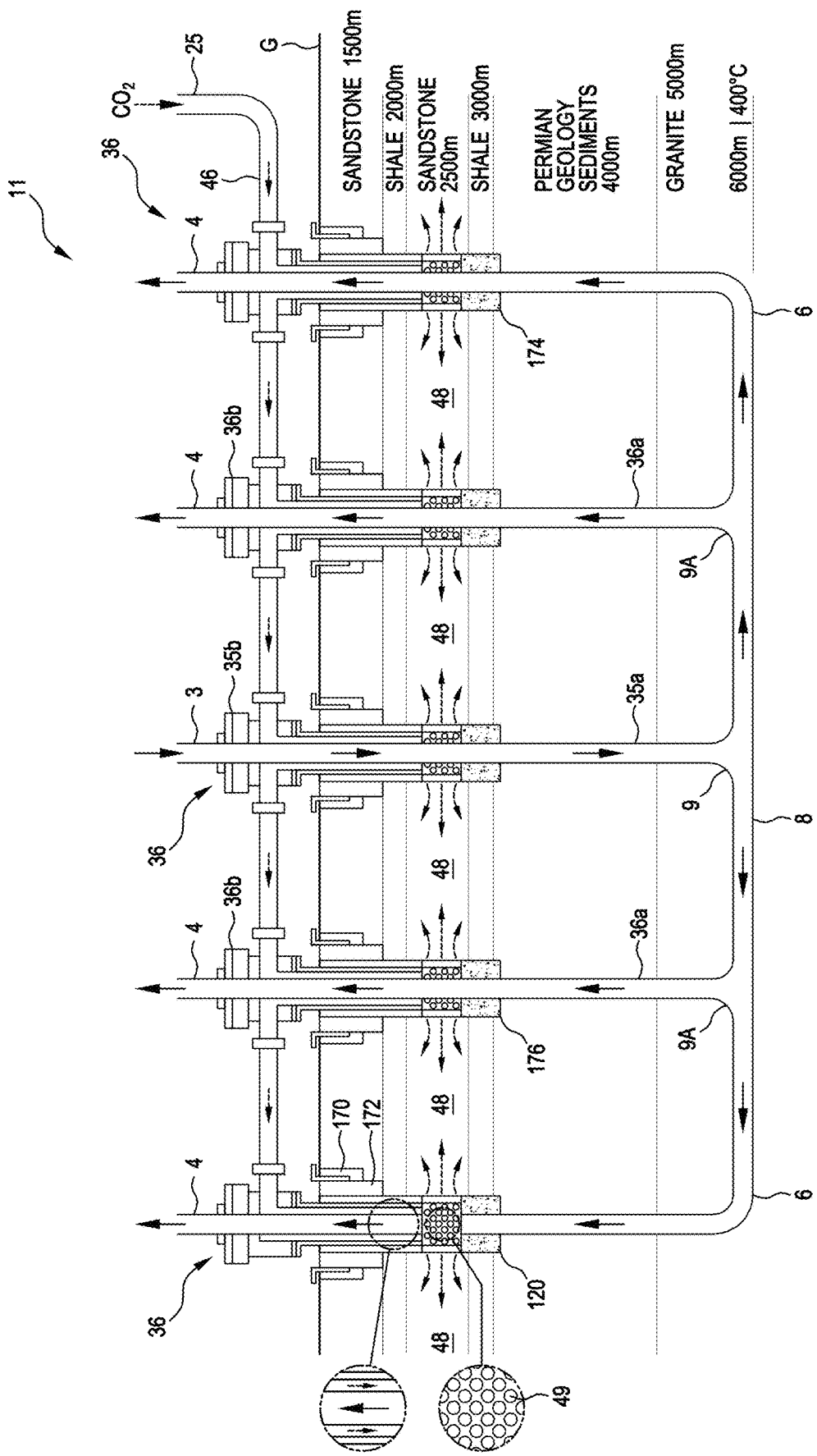
FIG. 4B is a schematic view of the subterranean well array of FIG. 4A.

In FIG. 4B the wells of the array (11) are illustrated to extend to a bottom-hole depth of about 6000 metres having a bottom-hole temperature of about 400° C. It will be appreciated by those skilled in the art, that the bottom-hole depth and the temperatures required to drive the system (101) will be tailored for each installation to ensure that sufficient thermal energy can be harvested from the array (11).

The direction of the flow of primary liquid into and out of the wells (35, 36) is indicated in FIG. 4B by solid arrows and the direction of fluid flow within well array (11) is indicated by dashed arrows.

The carbon dioxide injection annulus (116) of each well has an aperture (48) aligned with a sandstone layer of the geology, shown in FIG. 4B at about 2500 metres depth. The carbon dioxide injection annulus (116) is sealed at about 3000 metres with concrete or cement (176) to prevent carbon dioxide injection below this depth. The aperture (48) is configured as a plurality of apertures (48) in a perforated portion (49) of the carbon dioxide inlet casing (120). As the heated, pressurised carbon dioxide is pumped into the pipeline (46) it is directed towards the apertures (48) and forced into the sandstone layer of the geology for sequestration therein.

Figures 5A, 5B:
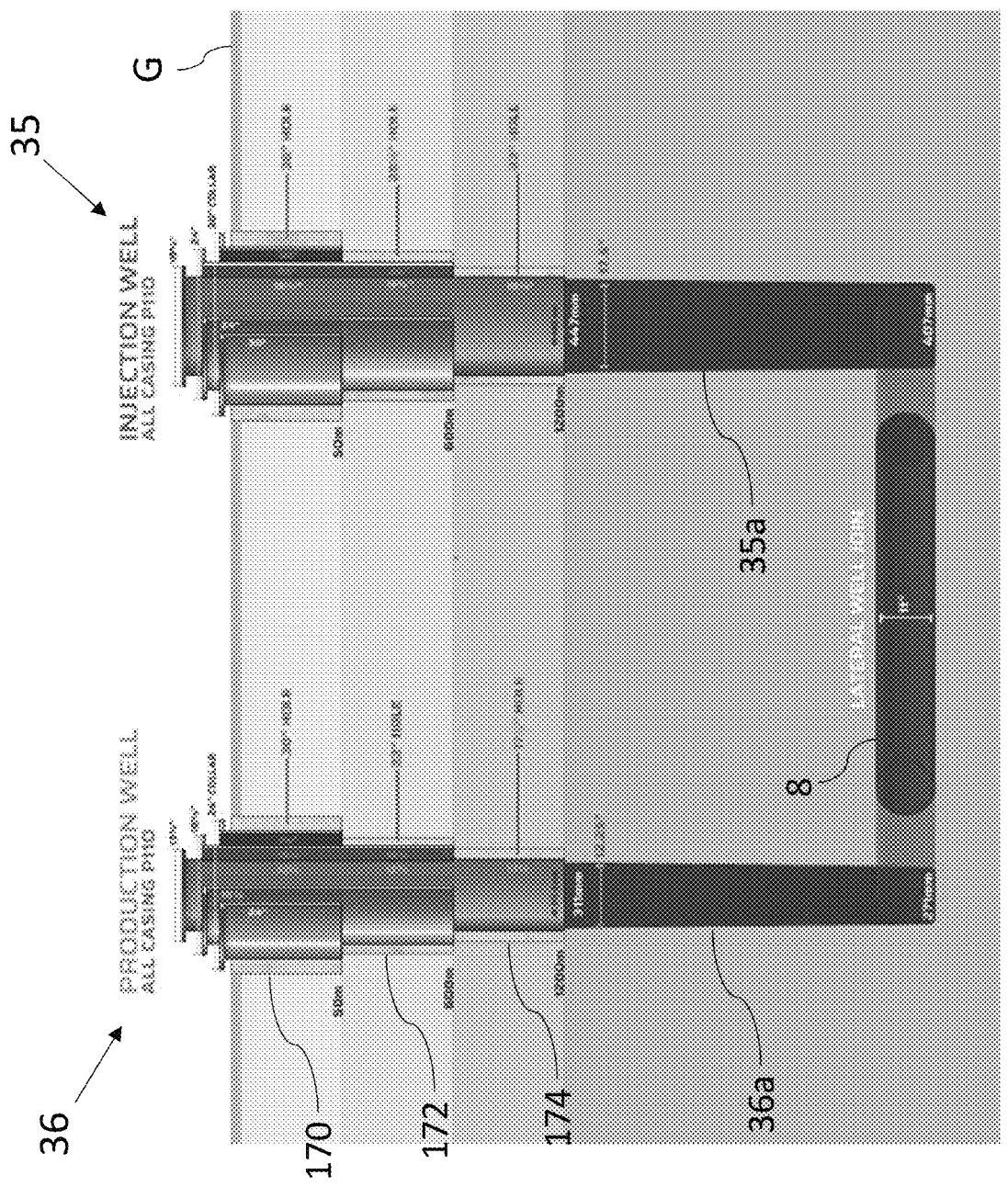
FIG. 5A is a partial cutaway view of an injection well from FIG. 4A, illustrating layers of casings supporting the well at the surface and the penetration of the well into the surrounding geology.
FIG. 5B is a partial cutaway view of a production well from FIG. 4A, illustrating layers of casings supporting the well at the surface and the penetration of the well into the surrounding geology.

FIGS. 5A and 5B illustrate an exemplary production well (36) and an injection well (35) in accordance with embodiments of the system (101). The perforated portion (49) of the carbon dioxide inlet casing (120) is not illustrated in these partial sectional views of wells (35,36). FIGS. 5A and 5B provide a layered cross-sectional view of the collar casing (170), surface casing (172) and third inner casing (174) supporting each well bore (35a, 36a) at the surface (G) of the geology.

The faster flow rate at which liquid (3) is introduced to the system (101) via the single injection well (35) allows for minimal heat exchange on the downward journey towards the junction (9). As the flow volume of the liquid is split in two, the rate of flow drops by half as the liquid travels along the horizontal bore (8) at the highest geological temperatures. The reduced flow of liquid then turns through 90 degrees at junctions (9A) and elbows (6) to enter the production wells (36) to return to the surface (G) via the vertical bores (36a) of the production wells (36) at this reduced flow rate, allowing increased time for heat transfer from the geology to heat the liquid (4). The increased time for heating in bores (36a) is in comparison to the doubled flow rate at which the liquid is injected into the injection well (35).

Thermal energy transfer from the geology is primarily achieved in the upward flow of each production well (36), with a relatively small amount of thermal energy being transferred to the liquid on the downward flow of injection well (35) and from the short flow path of 50 m to 100 m in the horizontal bore section (8). A much larger amount of thermal energy transfer is achieved in the upward flow over several thousand metres in each of the production wells (36) from exposure to geology via the minimally insulated well inlet casing (121) and with the liquid travelling at a lesser flow rate.

In FIG. 4B, the injection well (35) is illustrated as the central well in the array (11); however, it is contemplated that the injection well (35) can be any well in the array (11). The system (101) of FIG. 4A illustrates only one injection well (35) however, it is contemplated that multiple injection wells (35) can be incorporated into the system (101).

It is calculated that 30 kg to 40 kg per second output flow rate to each of the production wells (36) provides the most efficient output productivity having four production wells, producing by virtue of a 100% thermal syphoning effect. Additionally, there are limitations to the maximum injection flow rate that the single injection well (35) can be subjected to. This limitation is calculated to be about 180 kg per second for a 15" diameter well. However, it is contemplated that a plurality of injection wells (35) can be installed in a given array (11) to overcome any flow limitations.

The heat transfer to the upper geology layers near the surface (G) also improves the efficiency of the system (101) as the geology is constantly heated from the heated liquid (4) travelling up the vertical bores (36a) of each production well (36).

Each well (35,36) extends through a series of geological layers including fresh water reservoirs, sandstone, shale, Cenozoic layer, Jurassic, lower Jurassic, Triassic layer, a Permian layer (eg. permeable layer) and a granite/bed rock layer.

Increasing the well spacing from 50 m to 100 m can increase the thermal output of the system (101), by reducing thermal interference between wells in each array (11). There are also additional benefits from increasing well spacing as the circulation rate in the system (101) will increase during later years of operation.

Using computer-modelling it was also shown that over the course of running the system (101) the production well temperatures and rates for each production well (36) will balance; meaning that each of the production wells (36) will naturally tend towards producing the same production rate and liquid temperature, if each well has the same geometry. The sustained large temperature difference between the injection well (35) and production wells (36), combined with the 3,000 to 6000 m depth of the system (101), enables the circulation of the primary liquid circuit (1) to be maintained by the thermosiphon, which negates the need for additional circulation pumps.

The system (101) has the potential to sustain geothermal carbon capture and sequestration beyond 100 years by conductive heat mining from the geology.

Figure 6:
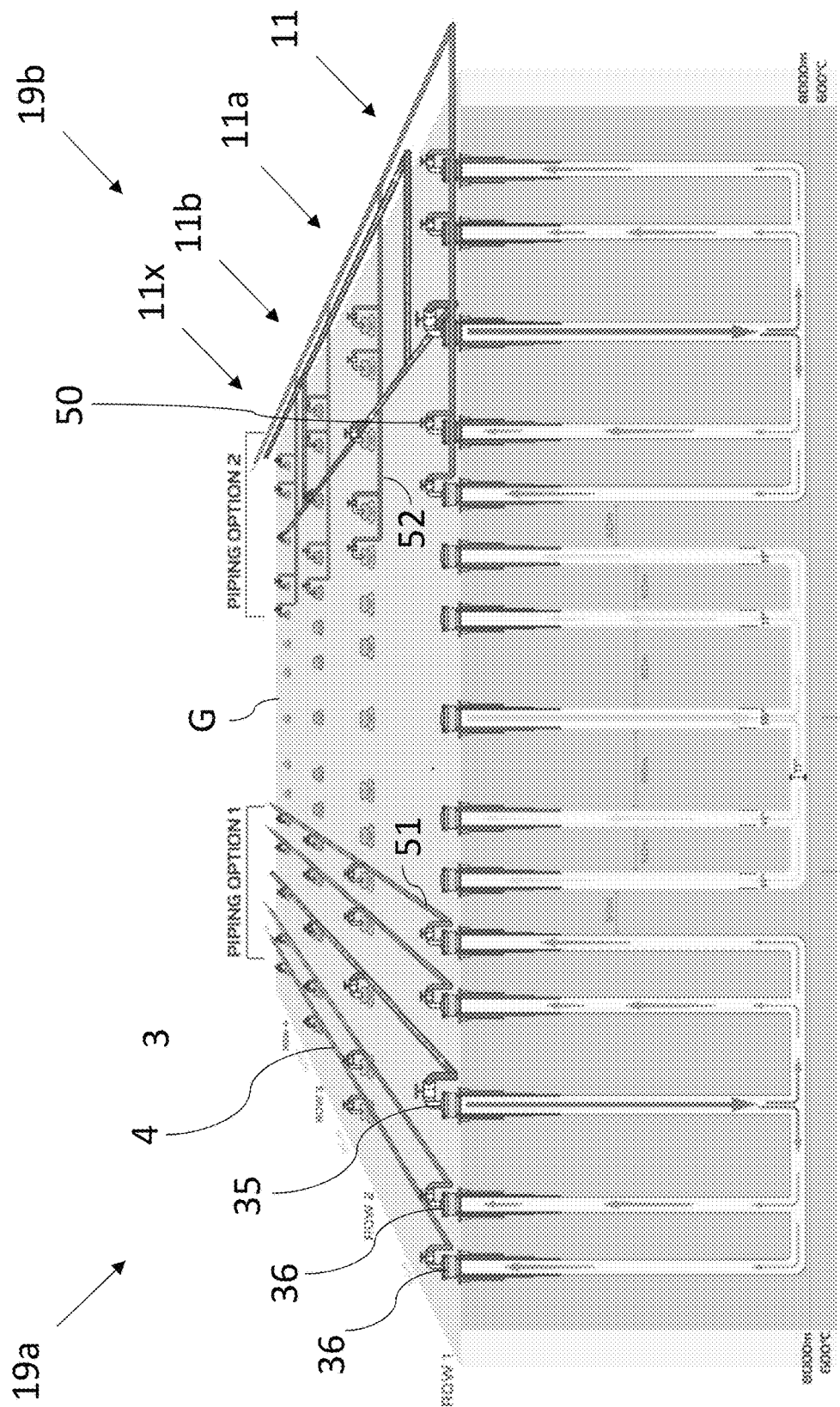
FIG. 6 is cross-sectional view of a geothermal well farm, illustrating two options for piping liquid to and from each multi-well system of the array within the farm.
Figure 7:
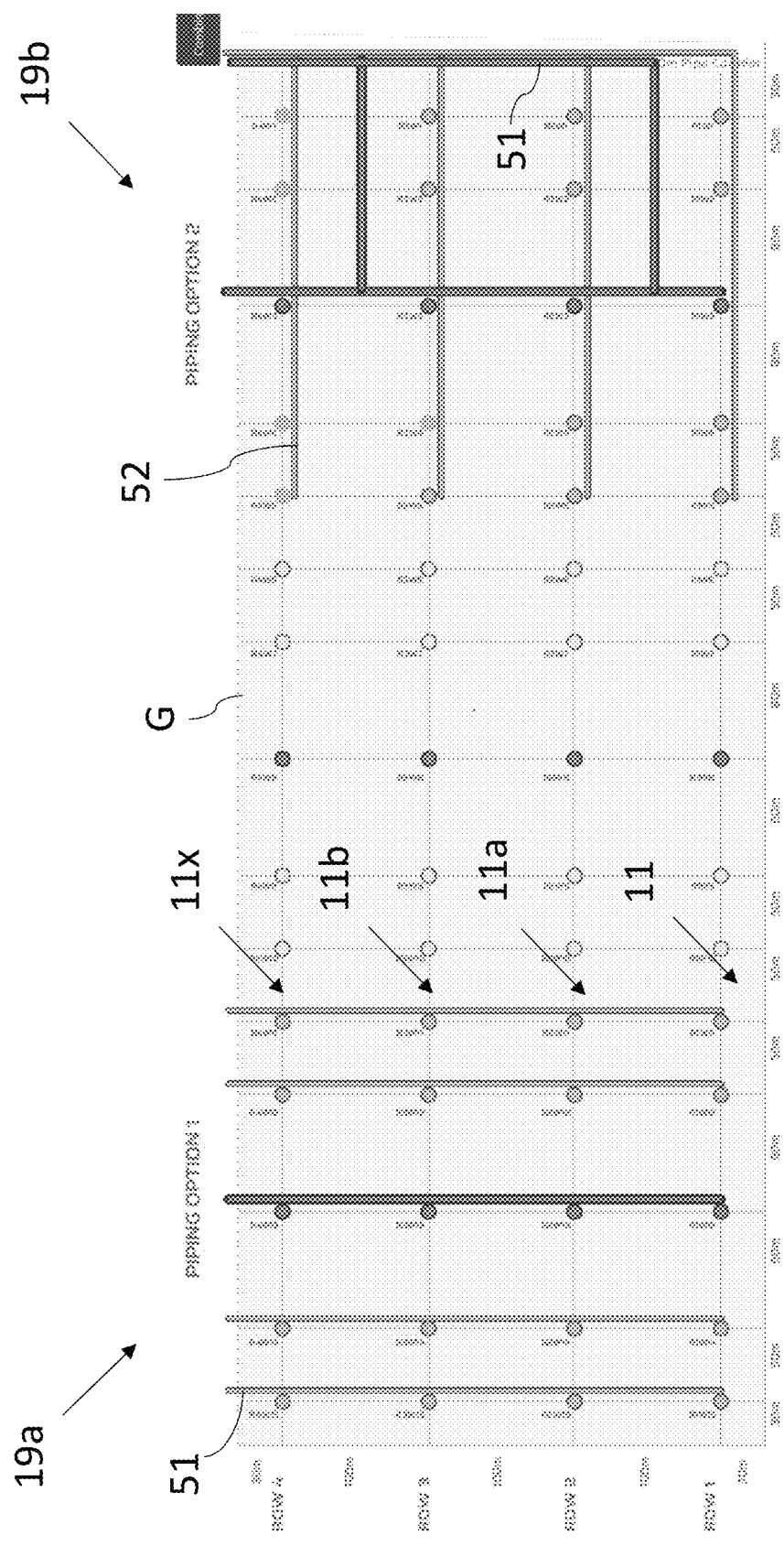
FIG. 7 is a plan view of the geothermal well farm from FIG. 6, illustrating a uniform 100 m spacing between adjacent rows of the farm, and a relative spacing between the wells of each multi-well array.

Turning now to FIGS. 6 and 7, where a plurality of arrays (11) are configured to provide a farm (19a, 19b) delivering liquid of the primary liquid circuit (1) to and from the heated geology. A first piping option is shown for a first farm (19a) and a second piping option is illustrated for a second farm (19b).

The arrays (11) of each farm (19a, 19b) are spaced apart from one another in rows, at a spacing of about 100 metres between each row. The wells of each array (11) can be spaced between 50 metres-100 metres apart. The production wells (36) closest to the central injection well (35) can be spaced at about 80 metres apart. The arrays (11) of each row can be spaced from each other by about 50 metres.

The first farm (19a) draws the heated primary liquid (4) from corresponding production wells (36) of each array (11) in each row of the farm (19a) in a plurality of longitudinal piping arrangements (51) delivering this heated liquid (4) to the turbine (10) to drive the compressor (14). In contrast, the second farm (19b) draws heated primary liquid (4) from each production well (36) in any one array (11) in a transverse piping arrangement (52) such that a plurality of transverse pipes (52) from each row of the farm (19b) are fed into a single longitudinal piping arrangement (51).

Each well head of each well, in each array (11, 11a, 11b, 11x), of the farm (19a, 19b) has a valving set (50) to allow one or more individual wells (35,36) to be selectively shut off and isolated from the primary liquid circuit (1) where maintenance or repair is required. In this manner the output from the system (100, 101) can also be tailored to meet a varying demand. In some embodiments, the valving set (50) can be an inlet flow control valve or an outlet flow control valve. The valving set (50) can also be used to vary the injection and production flow rates of the liquid through each array (11) allowing for adjustment to the output temperature of the heated liquid (4) delivered to the turbine (10). For example, slowing the rate at which the liquid travels through the geology can provide more time for heat transmission and thereby produce a hotter liquid (4) at the production well heads (36b).

Although not illustrated, in some embodiments of the system (101) redundant wells can be incorporated into the well array (11) of the primary liquid circuit (1), such that the valving set (50) can be adjusted to not drawn from a predetermined production well or injection well of the array (11) until required. This provides a flexibility in the system (101) to increase thermal energy harvesting if required, or reduce the thermal output of the system (101). This flexibility also allows for redistribution of the heated liquid (4) to be drawn from the remaining active production wells of the system (101). This redundancy further provides a contingency if there is any issue with the production or injection rates of any one of the wells in the array (11).

Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colours, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present disclosure.

As used herein and in the appended claims, the singular form of a word includes the plural, unless the context clearly dictates otherwise. Thus, the references "a," "an" and "the" are generally inclusive of the plurals of the respective terms. For example, reference to "a feature" includes a plurality of such "features." The term "and/or" used in the context of "X and/or Y" should be interpreted as "X," or "Y," or "X and Y.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g. within plus or minus five percent of a given angle or other value) are considered to be within the scope of the disclosure as recited in the appended claims. The term "approximately" when used with respect to values means plus or minus five percent of the associated value.

The terms "coupled" and the like as used herein mean the joining of two members directly or indirectly to one another. Such joining may be stationary (e.g. permanent) or moveable (e.g. removable or releasable). Such joining may be achieved with the two members or the two members and any additional intermediate members being integrally formed as a single unitary body with one another or with the two members or the two members and any additional intermediate members being attached to one another.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilise the claimed disclosures to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

It is to be understood that, if any prior art publication is referred to herein, such reference does not constitute an admission that the publication forms a part of the common general knowledge in the art, in Australia or any other country.

In the claims which follow and in the preceding description of the disclosure, except where the context requires otherwise due to express language or necessary implication, the word "comprise" or variations such as "comprises" or "comprising" is used in an inclusive sense, ie. to specify the presence of the stated features but not to preclude the presence or addition of further features in various embodiments of the disclosure.

| LEGEND | | | |
|---|---|---|---|
| No. | Description | No. | Description |
| 100 | Geothermal Carbon Capture system | 35 | Injection well |
| 101 | Multi-well system | 36 | Production well |
| 1 | Primary liquid circuit | 40 | CO2 Separator |
| 2 | Carbon dioxide circuit | 43 | 3rd party CO2 |
| 3 | Primary liquid | 44 | CO2 Output from separator |
| 4 | Heated liquid | 46 | CO2 line to well |
| 5 | Geothermal well | 48 | CO2 Injection point |
| 6 | Elbow | 49 | Perforated casing |
| 7 | Well head | 50 | Valving set |
| 8 | Horizontal bore | 51 | Longitudinal piping |
| 9 | Junction | 52 | Transverse piping |
| 10 | Turbine | 58 | Oxygen out |
| 11 | Well array | 60 | Condenser |
| 12 | Mechanical output | | |
| 13 | Compressed air line ① | 112 | Well inlet annulus |
| 14 | Air compressor | 114 | Well outlet annulus |
| 15 | Compressed air line ② | 116 | CO2 inlet annulus |
| 19 | Well farm | 118 | Coupling flanges |
| 20 | Fresh water | 120 | CO2 inlet casing |
| 22 | Nitrogen | 121 | Well inlet casing |
| 25 | Carbon dioxide | 122 | Insulated outlet casing |
| 28 | Ambient air intake | 170 | First collar casing |
| 29 | CO2 pump | 172 | Second surface casing |
| 30 | Air intake | 174 | Third collar casing |
| G | Ground | 176 | Cement/Cladding |

The invention claimed is:

1. A geothermal carbon capture system, comprising:
a primary liquid circuit circulating liquid into a geothermal well and returning heated liquid from a well head of the geothermal well, the primary liquid circuit passing through a condenser;
a turbine driven by the heated liquid to power a compressor configured to draw in and compress ambient air to feed a first compressed air supply and a second compressed air supply,
wherein the first compressed air supply is directed to a separator to extract carbon dioxide therefrom; and
the second compressed air supply drives a pump to force the carbon dioxide extracted from the separator towards a reinjection well for reinjection into geology surrounding the reinjection well.

2. The system of claim 1, wherein the geothermal well comprises a liquid injection bore and a liquid extraction bore coaxially located with a carbon dioxide injection bore of the reinjection well.

3. The system of claim 2, wherein the liquid injection bore, the liquid extraction bore and the carbon dioxide injection bore are connected via a triple well head.

4. The system of claim 2, wherein the liquid extraction bore is centrally located in the geothermal well forming an inner annulus of the geothermal well delivering heated liquid to the turbine.

5. The system of claim 2, wherein the liquid injection bore surrounds the liquid extraction bore forming an intermediary annulus of the geothermal well, delivering liquid into the geothermal well.

6. The system of claim 2, wherein the carbon dioxide injection bore of the reinjection well encases each of the liquid extraction bore and liquid injection bore of the geothermal well, forming an outer annulus for delivering carbon dioxide into the surrounding geology of the reinjection well.

7. The system of claim 6, wherein the outer annulus is bounded by a carbon dioxide inlet casing comprising at least one aperture for injecting carbon dioxide into the geology surrounding the reinjection well.

8. The system of claim 7, wherein the at least one aperture comprises a plurality of apertures formed in a perforated casing of the carbon dioxide inlet casing.

9. The system of claim 8, wherein the plurality of apertures is selectively closable or openable by rotating a closing sleeve relative to the carbon dioxide inlet casing to block the apertures therein.

10. The system of claim 6, wherein the outer annulus is sealed at a depth below the at least one aperture.

11. The system of claim 1, wherein the geothermal well comprises a liquid injection bore and a liquid extraction bore, spaced apart from a carbon dioxide injection bore of the reinjection well, and wherein the liquid injection bore and the liquid extraction bore are connected via a dual well head.

12. The system of claim 11, wherein the turbine is located downstream of the well head and upstream of the condenser.

13. The system of claim 1, wherein the geothermal well comprises at least one injection bore and at least one production bore spaced from one another in an array, each of the at least one injection bore and the at least one production bore being encircled by a dedicated carbon dioxide reinjection bore defining a plurality of reinjection wells.

14. The system of claim 13, wherein each injection bore and each production bore of the geothermal well comprises a dual-flow well head to either deliver liquid to or draw heated liquid from the geothermal well and simultaneously deliver carbon dioxide to the surrounding geology via the plurality of reinjection wells.

15. The system of claim 1, wherein each bore of the geothermal well forms a single closed loop of the primary liquid circuit, such that the volume of liquid entering the geothermal well is equal to the volume of fluid exiting the geothermal well.

16. The system of claim 1, wherein at least one of the geothermal well and the reinjection well comprises a series of nested casings, extending downwardly from a surface into the geology surrounding the geothermal well.

17. The system of claim 1, wherein:
the condenser reduces a temperature of the primary liquid circuit by facilitating dissipation of thermal energy from the heated liquid to the ambient air drawn into the compressor before the liquid is directed back to the geothermal well;
the condenser provides an air cooling system for the liquid of the primary liquid circuit sufficient to propagate a thermal syphoning effect in the primary circuit; and the liquid entering exiting the geothermal well is at a temperature of about 100° C. to 300° C.; and the liquid entering the geothermal well is at a temperature of about 5° C. to 10° C. above a temperature of the ambient air drawn into the condenser.

18. A method of capturing carbon dioxide from ambient air and reinjecting the captured carbon dioxide into surrounding geology, the method comprising the steps of:
 (i) circulating a primary liquid in a primary liquid circuit into a geothermal well and returning heated liquid from a well head of the geothermal well, the primary liquid circuit passing through a condenser;
 (ii) driving a turbine from the heated liquid to power a compressor, the compressor configured to draw in an ambient air source and compress the ambient air source into a plurality of compressed air supplies;
 (iii) supplying a first compressed air supply to a separator to extract carbon dioxide therefrom; and
 (iv) supplying a second compressed air supply to drive a pump, the pump configured to force the carbon dioxide extracted from the separator towards a reinjection well for reinjection into geology surrounding the reinjection well.

19. The method of claim 18, further comprising the step of cooling the liquid of the primary liquid circuit by drawing the heated liquid through the condenser.

20. The method of claim 18, further comprising the step of warming the ambient air source by drawing the ambient air source across the condenser.

* * * * *